United States Patent
Takezawa

(10) Patent No.: US 8,133,374 B2
(45) Date of Patent: Mar. 13, 2012

(54) METHOD AND APPARATUS FOR MANUFACTURING NEGATIVE ELECTRODE FOR NON-AQUEOUS ELECTROLYTE SECONDARY BATTERY

(75) Inventor: Hideharu Takezawa, Osaka (JP)

(73) Assignee: Panasonic Corporation, Osaka (JP)

( * ) Notice: Subject to any disclaimer, the term of this patent is extended or adjusted under 35 U.S.C. 154(b) by 1211 days.

(21) Appl. No.: 11/856,760

(22) Filed: Sep. 18, 2007

(65) Prior Publication Data

US 2008/0073217 A1    Mar. 27, 2008

(30) Foreign Application Priority Data

Sep. 21, 2006  (JP) ................... 2006-255597
Oct. 2, 2006    (JP) ................... 2006-270391

(51) Int. Cl.
*C25D 21/12*    (2006.01)
*H01M 10/0525*  (2010.01)

(52) U.S. Cl. .......... 205/82; 205/57; 205/138; 29/623.1; 29/623.5; 429/246

(58) Field of Classification Search ............ 205/82
See application file for complete search history.

(56) References Cited

U.S. PATENT DOCUMENTS

| | | | | |
|---|---|---|---|---|
| 4,370,210 A | * | 1/1983 | Yoshihara et al. | 205/82 |
| 4,469,565 A | * | 9/1984 | Hampel | 205/130 |
| 4,980,250 A | * | 12/1990 | Takahashi et al. | 429/306 |
| 5,292,424 A | * | 3/1994 | Blasing et al. | 205/82 |
| 5,595,837 A | * | 1/1997 | Olsen et al. | 429/224 |
| 6,649,033 B2 | * | 11/2003 | Yagi et al. | 204/192.23 |
| 2003/0170540 A1 | * | 9/2003 | Ohzuku et al. | 429/231.1 |
| 2006/0110660 A1 | * | 5/2006 | Satou et al. | 429/231.95 |
| 2006/0188777 A1 | * | 8/2006 | Kaneta | 429/128 |
| 2006/0194115 A1 | * | 8/2006 | De Jonghe et al. | 429/246 |
| 2006/0248710 A1 | * | 11/2006 | Fukumoto et al. | 29/623.5 |
| 2008/0050653 A1 | * | 2/2008 | Berkowitz et al. | 429/221 |

FOREIGN PATENT DOCUMENTS

| | | |
|---|---|---|
| JP | 2005-038720 | 2/2005 |
| WO | 96-27910 | 9/1996 |

* cited by examiner

*Primary Examiner* — Harry D Wilkins, III
*Assistant Examiner* — Bryan D. Ripa
(74) *Attorney, Agent, or Firm* — Pearne & Gordon LLP

(57) ABSTRACT

A method for manufacturing a negative electrode for a non-aqueous electrolyte secondary battery is provided. A negative electrode precursor of the non-aqueous electrolyte secondary battery is allowed to absorb lithium ions, the negative electrode precursor includes a current collector and an active material layer formed on the current collector. The precursor is provided with an exposed portion of the current collector. In this method, a negative electrode active material layer is allowed to absorb lithium ions by electrolysis in the non-aqueous electrolyte solution. At this time, by measuring a potential of a portion immersed in the non-aqueous electrolyte solution, the exposed portion is detected and an electric current of the electrolysis is controlled. Thereby, the deposition of lithium metal on the exposed portion is suppressed.

13 Claims, 7 Drawing Sheets

METHOD AND APPARATUS FOR MANUFACTURING NEGATIVE ELECTRODE FOR NON-AQUEOUS ELECTROLYTE SECONDARY BATTERY

BACKGROUND OF THE INVENTION

1. Field of the Invention

The present invention relates to a method and an apparatus for compensating for the irreversible capacity of a negative electrode active material in which in a process of manufacturing a negative electrode for a non-aqueous electrolyte secondary battery using the negative electrode active material with high capacity density, a precursor of the negative electrode is allowed to absorb lithium ions.

2. Background Art

With the widespread use of portable and cordless electronic equipment, the expectation has been increasing for compact, light-weight and high energy density non-aqueous electrolyte secondary batteries. At present, carbon materials such as graphite are practically used as a negative electrode active material for a non-aqueous electrolyte secondary battery. However, the theoretical capacity density of such a material is 372 mAh/g. In order to further increase the energy density of the non-aqueous electrolyte secondary battery, it has been considered to use silicon (Si), tin (Sn), germanium (Ge) and oxides or alloys thereof, which have a higher theoretical capacity density than that of carbon materials. In particular, it has been widely considered to use silicon-containing particles such as Si particles or silicon oxide particles because they are inexpensive.

The above-mentioned negative electrode active materials are incorporated into a battery in a state in which they do not contain a lithium ion unless the materials are particularly subjected to any treatment. A lithium ion contributing to the battery capacity is derived from only the positive electrode active material. In batteries using negative electrode active materials that have not been subjected to any treatment in advance, the irreversible capacity at the time of initial charge is large. Consequently, lithium ions that can be used after the initial discharge are decreased, and thus the battery capacity is reduced. Accordingly, the high capacity density of the negative electrode active material cannot be used satisfactorily.

In order to compensate for this irreversible capacity, attaching a lithium metal foil to the surface of a negative electrode in advance, or forming a lithium metal layer on the surface of a negative electrode by a film formation method in dry processes such as a vacuum deposition method and ion plating have been proposed. Such techniques are disclosed in, for example, International Publication WO 96/27910 pamphlet and Japanese Patent Unexamined Publication No. 2005-038720.

However, since the amount of lithium metal corresponding to the irreversible capacity is very small, when a lithium foil is attached to the surface of a negative electrode, it is necessary to produce an extremely thin foil and attach it. It is difficult to produce such a metal foil and difficult to handle such a metal foil. Therefore, a process of manufacturing a negative electrode becomes complicated. On the other hand, when relatively thick lithium foils are attached to a negative electrode sparsely, the amount of lithium absorbed by the negative electrode active material largely varies in the plane of the electrode. In general, a negative electrode active material having a large capacity density swells according to charging. Accordingly, when a lithium foil is attached in this way, concavities and convexities are generated on the negative electrode and the charge and discharge reaction becomes ununiform. As a result, for example, the charge-discharge cycle property is reduced. Furthermore, when excess lithium metal foils are attached, lithium metals that cannot be absorbed by the negative electrode active material are left on the surface of the negative electrode. At the charging time, dendrites may be generated on the sites. Therefore, there are problems left in terms of the thermal stability and safety.

On the other hand, when a lithium metal layer is formed on the surface of a negative electrode by a film formation method in dry processes, the temperature of the negative electrode rises. This affects the strength of a binder for forming the negative electrode active material layer. When the strength of the binder is lowered, due to the change of stress according to the change of volume of the negative electrode active material at the time of charging and discharging, conductive network between active materials cannot be maintained and the charge-discharge cycle property is lowered. In particular, as mentioned above, the volume of the negative electrode active materials with high capacity density is generally changed according to charge and discharge. Therefore, when such a negative electrode active material is used, the negative electrode active material layer may be easily broken.

SUMMARY OF THE INVENTION

According to the present invention, a negative electrode precursor of the non-aqueous electrolyte secondary battery, which includes a current collector and an active material layer formed on the current collector and has an exposed portion of the current collector formed by making a part of the current collector be exposed, is allowed to absorb lithium ions. The first method includes the following five steps.

(A) Pulling out the negative electrode precursor that has been wound up.

(B) Inserting the pulled-out negative electrode precursor into a non-aqueous electrolyte solution containing lithium ions.

(C) Measuring a potential in a vicinity of a reference electrode in a portion immersed in the non-aqueous electrolyte solution of the negative electrode precursor, the reference electrode being provided in the non-aqueous electrolyte solution.

(D) Controlling an amount of lithium ions absorbed by the active material layer by controlling an electric current flowing between the negative electrode precursor and an electrode disposed facing the active material layer and capable of releasing lithium ions in the non-aqueous electrolyte solution based on the measured potential.

(E) Winding up the negative electrode precursor that has been treated to absorb lithium ions.

Thus, in the first method in accordance with the present invention, the negative electrode precursor is allowed to absorb lithium ions electrochemically in the non-aqueous electrolyte solution. Thereby, it is possible to supply negative electrode active material with lithium ions in an amount necessary to compensate for the irreversible capacity of the negative electrode active material. Thus, a large capacity density of the negative electrode active material can be utilized. At this time, it is possible to suppress the deposition of a highly reactive lithium metal on the exposed portion of the current collector through which the negative electrode electrically connects with an outer terminal. Consequently, when the exposed portion is welded, problems such as ignition to a lithium metal can be avoided. Therefore, the productivity can be improved.

Furthermore, the second method has the following three steps instead of the above-mentioned steps B to D.

F) Inserting the pulled-out negative electrode precursor into an electrolytic bath holding a non-aqueous electrolyte solution containing lithium ions.

G) Allowing the active material layer to absorb lithium ions by allowing an electric current to flow between the negative electrode precursor and a counter electrode that is disposed facing the active material layer in the non-aqueous electrolyte solution and that is inactive to a supply of lithium ions.

H) Supplying the electrolytic bath with a non-aqueous electrolyte solution having the same composition as that of the non-aqueous electrolyte solution held previously in the electrolytic bath, and removing the non-aqueous electrolyte solution in the same amount as the supplied amount from the electrolytic bath.

Thus, in the second method in accordance with the present invention, the negative electrode precursor is allowed to absorb lithium ions electrochemically in the non-aqueous electrolyte solution. Thereby, it is possible to supply the negative electrode active material with lithium ions in an amount necessary to compensate for the irreversible capacity of the negative electrode active material. Thus, a large capacity density of the negative electrode active material can be utilized. At this time, by using an electrode that is inactive to the supply of lithium ions, lithium ions dissolved in the non-aqueous electrolyte solution are absorbed by the active material. On the other hand, a non-aqueous electrolyte solution having the same composition as that of the non-aqueous electrolyte solution held previously in the electrolytic bath is supplied to the electrolytic bath and the same amount as the supplied amount of the non-aqueous electrolyte solution is removed from the electrolytic bath. Thereby, the concentration of lithium ions in the non-aqueous electrolyte solution can be kept substantially constant. Consequently, it is possible to allow the active material layer of the negative electrode precursor to absorb lithium ions continuously. Therefore, the productivity is improved.

DETAILED DESCRIPTION OF THE INVENTION

Hereinafter, embodiments of the present invention are described with reference to drawings. Note here that the present invention is not particularly limited to the below described contents as long as it is based on the basic prefectures described in this specification.

First Embodiment

Figure 1:
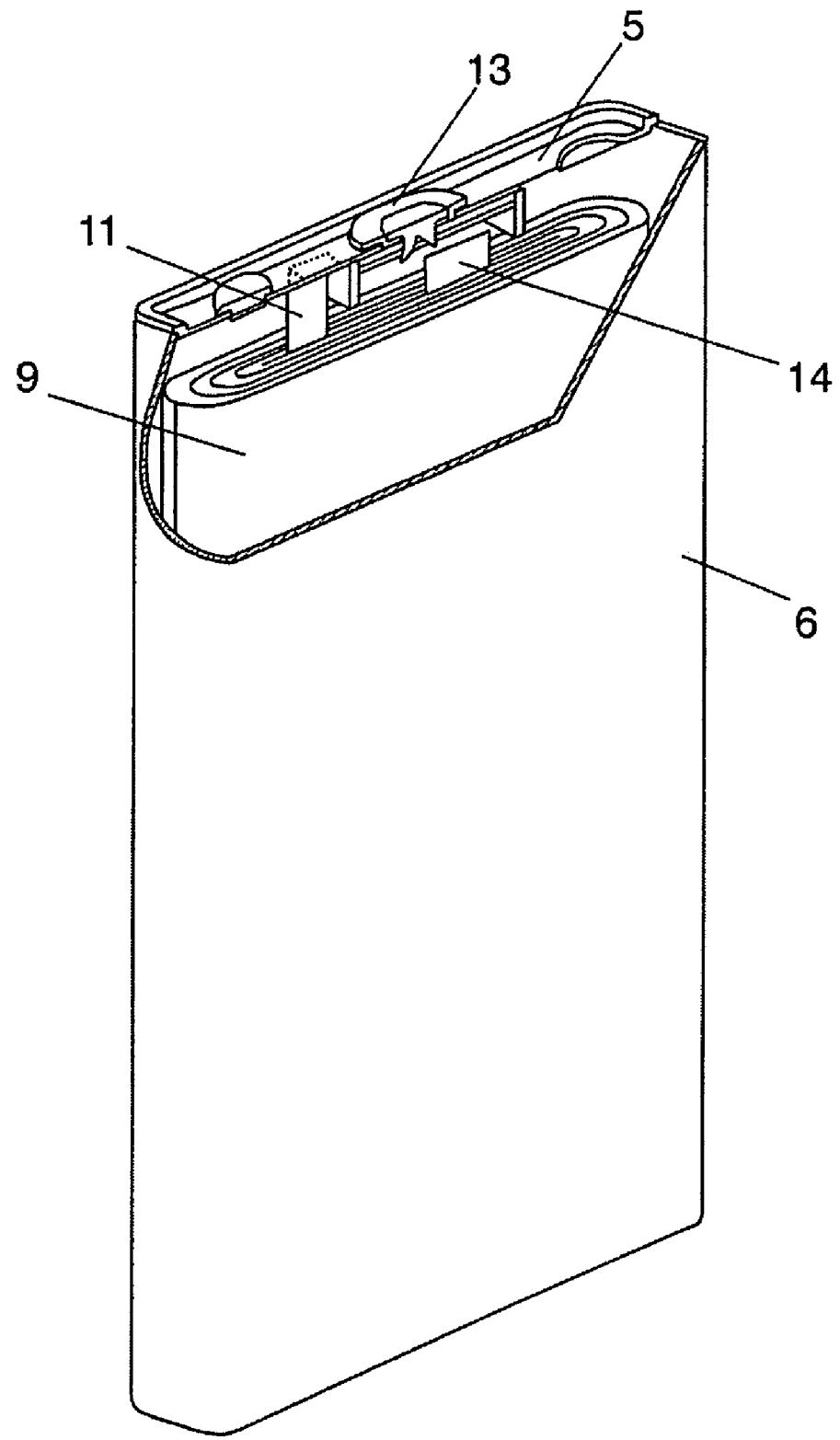
FIG. 1 is a partial cut-away perspective view showing a non-aqueous electrolyte secondary battery in accordance with a first embodiment of the present invention.
Figure 2:
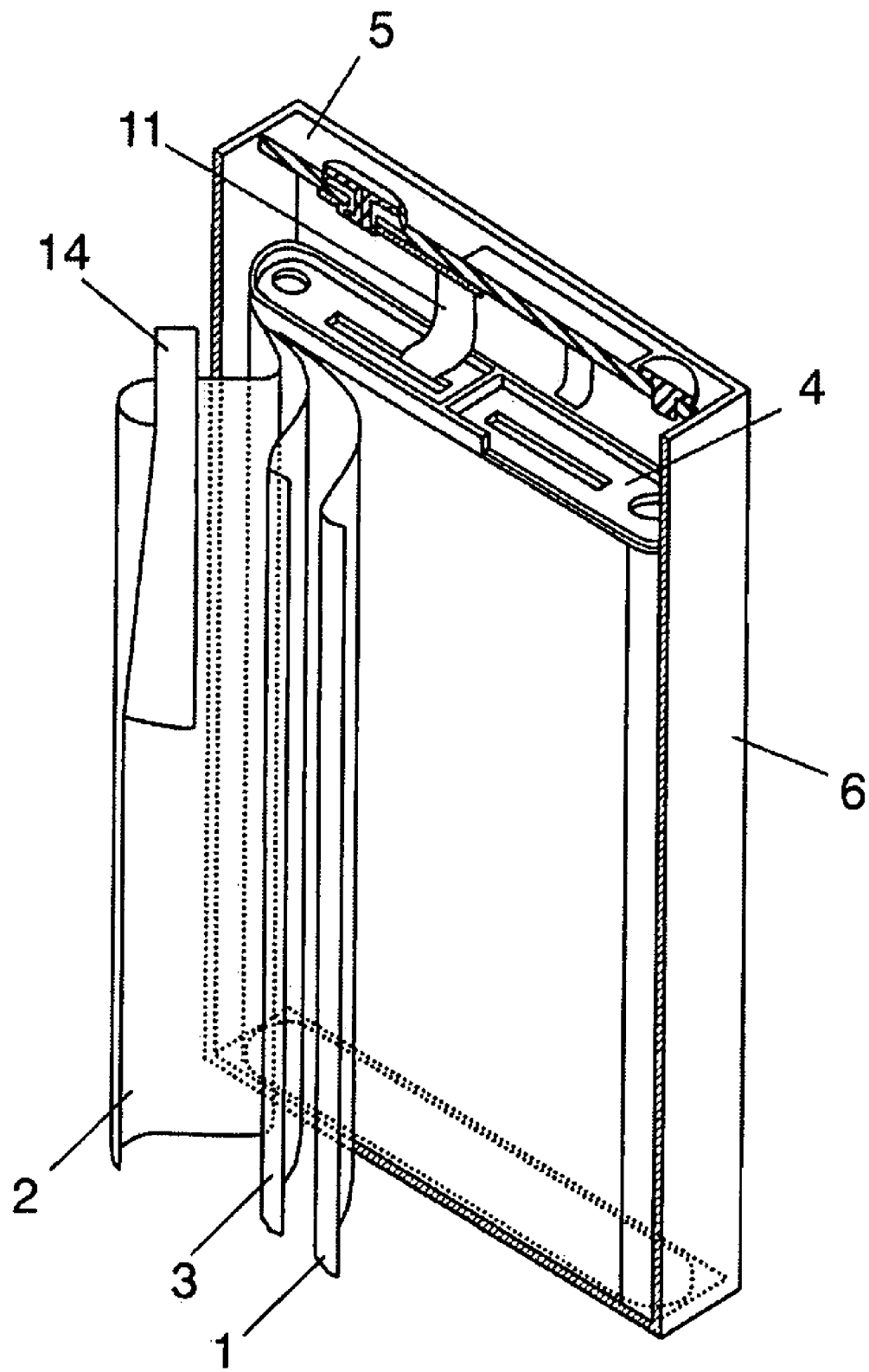
FIG. 2 is an exploded perspective view showing the non-aqueous electrolyte secondary battery shown in FIG. 1.

FIG. 1 is a partial cut-away perspective view showing a non-aqueous electrolyte secondary battery in accordance with a first embodiment of the present invention; and FIG. 2 is an exploded perspective view showing the non-aqueous electrolyte secondary battery. This prismatic battery includes negative electrode 1, positive electrode 2 facing negative electrode 1 and reducing lithium ions at the discharging time, and separator 3 inserted between negative electrode 1 and positive electrode 2 and preventing negative electrode 1 and positive electrode 2 from being brought into direct contact with each other. Negative electrode 1 and positive electrode 2 together with separator 3 are wound so as to form electrode body 9. Electrode body 9 together with a non-aqueous electrolyte solution (not shown) is accommodated in case 6. On the upper part of electrode body 9, resin frame 4 is disposed for separating electrode body 9 and lid 5 from each other and separating lead 11 and case 6 from each other.

Negative electrode 1 includes a negative electrode current collector and negative electrode active material layers provided on the both surfaces of the current collector. Lead 11 is attached by, for example, welding to the negative electrode current collector. Another end of lead 11 is coupled to terminal 13 provided in lid 5.

Positive electrode 2 includes a current collector and positive electrode active material layers including a positive electrode active material on both surfaces of the positive electrode current collector. Lead 14 is attached to the positive electrode current collector. Another end of lead 14 is coupled to case 6 that also works as a positive terminal.

Each of the negative electrode active material layers includes at least an active material capable of absorbing and releasing lithium ions. As this active material, a carbon material such as graphite or amorphous carbon can be used. Alternatively, it is possible to use materials, for example, silicon (Si), tin (Sn), or the like, which are capable of absorbing and releasing a large amount of lithium ions at a lower potential as compared with the positive electrode active material. Such materials can exert the effect of the present invention regardless of whether such a material is any of a elemental substance, an alloy, a compound, a solid solution and a composite active material containing a silicon-containing material or a tin-containing material. In particular, the silicon-containing material is preferable because it has a large capacity density and is inexpensive. An example of the silicon-containing materials may include Si, $SiO_x$ (0.05<x<1.95), and an alloy, a compound or a solid solution of any of the above-mentioned materials in which a part of Si is replaced with at least one atom selected from the group consisting of B, Mg, Ni, Ti, Mo, Co, Ca, Cr, Cu, Fe, Mn, Nb, Ta, V, W, Zn, C, N and Sn. An example of the tin-containing materials may include $Ni_2Sn_4$, $Mg_2Sn$, $SnO_x$ (0<x<2), $SnO_2$, $SnSiO_3$, LiSnO, and the like.

A negative electrode active material may be formed of these materials singly or in combination with plural kinds of materials. An example of formation of a negative electrode active material by using plural kinds of materials mentioned above may include a compound containing Si, oxygen and nitrogen or a composite of plurality of compounds containing Si and oxygen with different constituting ratio of Si and oxygen. Among them, $SiO_x$ ($0.3 \leq x \leq 1.3$) is preferable because it has a large discharge capacity density and it has a smaller swelling degree at the charging time as compared with the case where a Si elemental substance is used.

The negative electrode active material layer further includes a binder. An example of the binder may include, for example, polyvinylidene-fluoride (PVDF), polytetrafluoroethylene, polyethylene, polypropylene, aramid resin, polyamide, polyimide, polyamide-imide, polyacrylonitrile, polyacrylic acid, polymethylacrylate, polyethylacrylate, polyhexylacrylate, polymethacrylic acid, polymethylmethacrylate, polyethylmethacrylate, polyhexylmethacrylate, polyvinylacetate, polyvinylpyrrolidone, polyether, polyethersulfone, polyhexafluoropropylene, styrene-butadiene rubber, carboxymethylcellulose, and the like. Furthermore, a copolymer of two or more kinds of materials selected from tetrafluoroethylene, hexafluoroethylene, hexafluoropropylene, perifluoro-alkylvinyl ether, vinylidenefluoride, chlorotrifluoroethylene, ethylene, propylene, pentafluoropropylene, fluoromethylvinyl ether, acrylic acid, hexadiene, may be used.

Furthermore, if necessary, a conductive agent may be mixed in the negative electrode active material layer. An example of the conductive agent includes graphites including natural graphites such as flake graphites, artificial graphites, and expanded graphites; carbon blacks such as acetylene black, Ketjen black, channel black, furnace black, lampblack and thermal black; conductive fibers such as carbon fibers and metal fibers; metal powders of copper, nickel, or the like; organic conductive materials such as polyphenylene derivative, and the like. In particular, it is further preferable that fiber carbon materials are attached to negative electrode active material particles so as to form a conductive network of negative electrode active material particles.

For the negative electrode current collector, lead 11 and terminal 13, a metal foil of stainless steel, nickel, copper, titanium, and the like, and a thin film of, for example, carbon and conductive resin can be used. Furthermore, surface treatment may be carried out by using carbon, nickel, titanium, and the like.

The positive electrode active material layer includes a lithium-containing composite oxide such as $LiCoO_2$, $LiNiO_2$, and $LiMn_2O_4$ or a mixture thereof or a composite thereof, as a positive electrode active material. In particular, $Li_xM_yN_{1-y}O_2$ is preferable (in the formula, M and N denote at least one selected from Co, Ni, Mn, Cr, Fe, Mg, Al and Zn, contain at least Ni, and satisfy M≠N. $0.98 \leq x \leq 1.10$ and 0<y<1 are satisfied) because the capacity density is large.

As the positive electrode active material, besides the above-mentioned materials, olivine-type lithium phosphate expressed by the general formula: $LiMPO_4$ (M=V, Fe, Ni or Mn) and lithium fluorophosphate expressed by the general formula: $Li_2MPO_4F$ (M=V, Fe, Ni or Mn) can be used. Furthermore, a part of these lithium-containing compounds may be replaced with a different atom. Surface treatment may be carried out by using metal oxide, lithium oxide, conductive agent, and the like. A surface may be treated to have a hydrophobic property.

The positive electrode active material layer further includes a conductive agent and a binder. An example of the conductive agent may include graphites including natural graphites and artificial graphites; carbon blacks such as acetylene black, Ketjen black, channel black, furnace black, lampblack and thermal black; conductive fibers such as carbon fiber and metal fiber; metal powders such as aluminum powders; conductive whiskers of zinc oxide, potassium titanate, and the like; conductive metal oxide such as titanium oxide; an organic conductive material such as phenylene derivatives, and the like.

An example of the binder may include, for example, PVDF, polytetrafluoroethylene, polyethylene, polypropylene, aramid resin, polyamide, polyimide, polyamide-imide, polyacrylonitrile, polyacrylic acid, polymethylacrylate, polyethylacrylate, polyhexylacrylate, polymethacrylic acid, polymethylmethacrylate, polyethylmethacrylate, polyhexylmethacrylate, polyvinylacetate, polyvinylpyrrolidone, polyether, polyethersulfone, hexafluoropolypropylene, styrene-butadiene rubber, carboxymethylcellulose, and the like. Furthermore, a copolymer of two or more kinds of materials selected from tetrafluoroethylene, hexafluoroethylene, hexafluoropropylene, perfluoro-alkylvinyl ether, vinylidene-fluoride, chlorotrifluoroethylene, ethylene, propylene, pentafluoropropylene, fluoromethylvinyl ether, acrylic acid, hexadiene, may be used. Furthermore, a mixture including two or more of them may be used.

As the positive electrode current collector, lead 14 and case 6, aluminum (Al), carbon, conductive resin, and the like, can be used. Any of these materials, which have been subjected to surface treatment with carbon and the like, may be used.

As the nonaqueous electrolyte, nonaqueous solution based electrolyte solution in which a solute is dissolved in an organic solvent, and a so-called polymer electrolyte layer including these solutions and immobilized with a macromolecule can be used. At least in a case that an electrolyte solution is used, it is preferable that separator 3 formed of a nonwoven fabric or microporous membrane of polyethylene, polypropylene, aramid resin, amide-imide, polyphenylene sulfide, polyimide, and the like, is disposed between positive electrode 2 and negative electrode 1 and this is impregnated with an electrolyte solution.

The material of the nonaqueous electrolyte is selected based on the oxidation-reduction potential of the active material. The solute preferred to be used as a nonaqueous electrolyte includes $LiPF_6$, $LiBF_4$, $LiClO_4$, $LiAlCl_4$, $LiSbF_6$, LiSCN, $LiCF_3SO_3$, $LiN(CF_3CO_2)_2$, $LiN(CF_3SO_2)_2$, $LiAsF_6$, $LiB_{10}Cl_{10}$, lower aliphatic lithium carboxylate, LiF, LiCl, LiBr, LiI, chloroborane lithium, borates such as lithium bis(1,2-benzenedioleate(2-)-O,O') borate, lithium bis(2,3-naphthalenedioleate(2-)-O,O') borate, lithium bis(2,2'-biphenyldioleate(2-)-O,O') borate, lithium bis(5-fluoro-2-oleate-1-benzenesulfonate-O,O') borate, and lithium tetraphenyl borate, and the like. Salts generally used for a lithium battery can be applied.

Furthermore, an example of the organic solvent for dissolving the above-mentioned salts can include ethylene carbonate (EC), propylene carbonate, butylene carbonate, vinylene carbonate, dimethyl carbonate (DMC), diethyl carbonate, ethyl methyl carbonate (EMC), dipropyl carbonate, methyl formate, methyl acetate, methyl propionate, ethyl propionate, dimethoxymethane, γ-butyrolactone, γ-valerolactone, 1,2-diethoxyethane, 1,2-dimethoxyethane, ethoxymethoxyethane, trimethoxy methane, tetrahydrofuran, tetrahydrofuran derivative such as 2-methyltetrahydrofuran, dimethyl sulfoxide, 1,3-dioxolane, dioxolane derivative such as 4-methyl-1,3-dioxolane, formamide, acetamide, dimethylformamide, acetonitrile, propyl nitrile, nitromethane, ethyl monoglyme, phosphotriester, acetic acid ester, propionic acid ester, sulfolane, 3-methyl sulfolane, 1,3-dimethyl-2-imidazolidinone, 3-methyl-2-oxazolidinone, propylene carbonate derivative, ethyl ether, diethyl ether, 1,3-propanesultone, anisole, fluorobenzene, and a mixture of two or more of them. Solvents generally used in a lithium battery can be applied.

Furthermore, additives such as vinylene carbonate, cyclohexylbenzene, biphenyl, diphenyl ether, vinyl ethylene carbonate, divinyl ethylene carbonate, phenylethylene carbonate, diallyl carbonate, fluoroethylene carbonate, catechol carbonate, vinyl acetate, ethylene sulfite, propanesultone, trifluoropropylene carbonate, dibenzofuran, 2,4-difluoroanisole, o-terphenyl, m-terphenyl, and the like, may be included.

The nonaqueous electrolyte may be used as a solid electrolyte by mixing one polymer material or a mixture of two or more of the polymer materials with the above-mentioned solute. An example of the polymer material includes polyethylene oxide, polypropylene oxide, polyphosphazene, polyaziridine, polyethylene sulfide, polyvinyl alcohol, polyvinylidene-fluoride, polyhexafluoropropylene, and the like. Furthermore, the nonaqueous electrolyte may be used in a gel state by mixing with the above-mentioned organic solvents. Furthermore, an inorganic material such as lithium nitride, lithium halide, lithium oxoate, $Li_4SiO_4$, $Li_4SiO_4$—LiI—LiOH, $Li_3PO_4$—$Li_4SiO_4$, $Li_2SiS_3$, $Li_3PO_4$—$Li_2S$—$SiS_2$, and a phosphorus sulfide compound may be used as the solid electrolyte.

Next, a method for manufacturing positive electrode 2 is described briefly. Powdery positive electrode active material classified into predetermined grain sizes is stirred with a binder, a conductive agent and an appropriate amount of dispersion media so as to prepare a positive electrode mixture paste. This paste is coated on both surfaces of the positive electrode current collector, dried, and then roll pressed. Thus, positive electrode active material layers are formed on both surfaces of the positive electrode current collector, respectively. Thereafter, it is cut by a slitter so as to have a width capable of being inserted into prismatic case 6. Furthermore, a part of the positive electrode active material layer is peeled off and lead 14 is coupled to the positive electrode current collector. Thus, positive electrode 2 is produced.

Next, a method for manufacturing negative electrode 1 is described. Powdery negative electrode active material classified into predetermined grain sizes is stirred with a binder, a conductive agent and an appropriate amount of dispersion media so as to prepare a negative electrode mixture paste. This paste is coated on both surfaces of the negative electrode current collector, and dried. At this time, in order to couple lead 11 to the negative electrode current collector, a negative electrode mixture paste is coated intermittently. Then, roll pressing is carried out if necessary. Thus, negative electrode active material layers are formed on both surfaces of the negative electrode current collector, respectively, so as to produce a negative electrode precursor. Thereafter, a negative electrode active material contained in the negative electrode active material layer is allowed to absorb lithium ions of a amount corresponding to the irreversible capacity. Then, it is cut by a slitter so as to have a width that can be inserted into prismatic case 6 and is wider than the width of positive electrode 2. Furthermore, lead 11 is coupled to the exposed part of the negative electrode current collector. Thus, negative electrode 1 is produced.

Besides, a negative electrode precursor may be produced by accumulating the negative electrode active material onto the negative electrode current collector by using a gas phase method.

Figure 3:
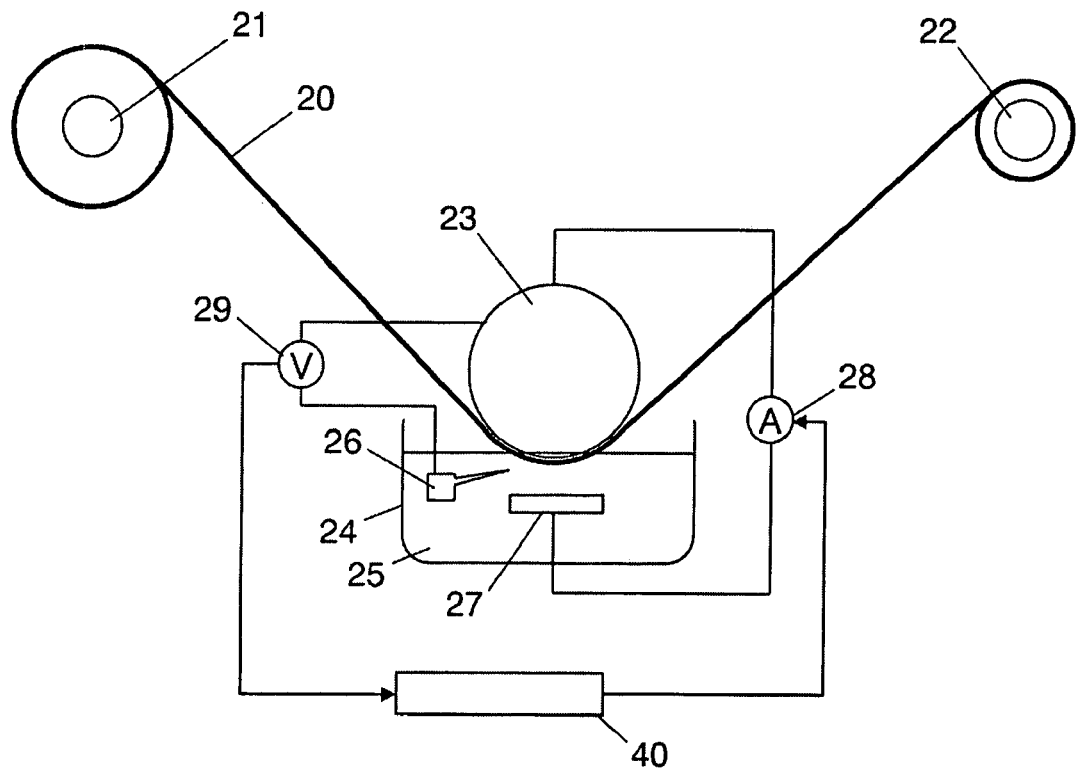
FIG. 3 is a schematic configuration view showing an apparatus for allowing a negative electrode active material layer of a negative electrode precursor to absorb lithium ions in accordance with the first embodiment of the present invention.
Figure 4:
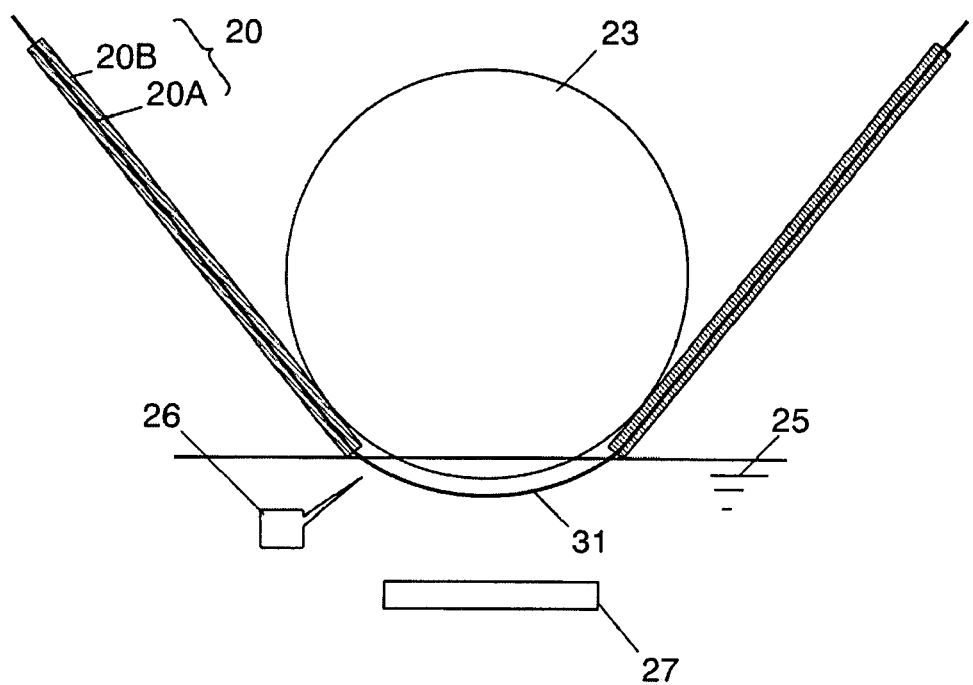
FIG. 4 is an enlarged view of a principal portion of the apparatus shown in FIG. 3.

Next, with reference to FIGS. 3 and 4, an apparatus for allowing the negative electrode active material layer of the negative electrode precursor to absorb lithium ions is described. FIG. 3 is a schematic configuration view showing an apparatus for allowing the negative electrode active material layer of the negative electrode precursor to absorb lithium ions; and FIG. 4 is an enlarged view of a principal portion thereof.

Negative electrode precursor 20 produced as mentioned above includes current collector 20A and negative electrode active material layers (hereinafter, referred to as "active material layer") 20B formed on the both surfaces of the current collector. Negative electrode precursor 20 is supplied in a state in which it is wound on supply roll 21. Supply roll 21 is a winding-out portion for pulling out negative electrode precursor 20 that has been wound up.

This apparatus includes supply roll 21, electrolytic bath 24, power unit 28, reference electrode 26, electrode 27, potential sensor 29, controller 40 and winding-up roll 22. Electrolytic bath 24 holds non-aqueous electrolyte solution 25 containing lithium ions therein. Pulled-out negative electrode precursor 20 is immersed in non-aqueous electrolyte solution 25. Electrode 27 is formed of metallic lithium or an alloy containing lithium and disposed in non-aqueous electrolyte solution 25. That is to say, electrode 27 is an electrode capable of releasing lithium ions. Power unit 28 allows an electric current to flow between electrode 27 and negative electrode precursor 20 and allows the side facing electrode 27 of active material layer 20B (a first active material layer) to absorb lithium ions. Therefore, electrode 27 is exhausted in accordance with process, so that it is necessary to exchange electrode 27 with new one regularly.

Reference electrode 26 is disposed in the vicinity of a portion immersed in non-aqueous electrolyte solution 25 of negative electrode precursor 20. Potential sensor 29 measures a potential of the portion immersed in non-aqueous electrolyte solution 25 with respect to reference electrode 26. Based on the measured potential, controller 40 controls the amount of lithium ions absorbed by the side facing electrode 27 of active material layer 20B by controlling the electric current flowing between negative electrode precursor 20 and electrode 27. Winding-up roll 22 as a winding-up portion winds up negative electrode precursor 20 that has been treated to absorb lithium ions.

A method for allowing active material layer 20B of negative electrode precursor 20 to absorb lithium ions by using this apparatus is described. Firstly, wound-up negative electrode precursor 20 is pulled out from supply roll 21. Next, pulled-out negative electrode precursor 20 is inserted into non-aqueous electrolyte solution 25. Negative electrode precursor 20 is immersed into non-aqueous electrolyte solution 25 along immersion roll 23 and pulled out from non-aqueous electrolyte solution 25 along immersion roll 23.

Potential sensor 29 measures the potential in the vicinity of reference electrode 26 in a portion immersed in non-aqueous electrolyte solution 25 of negative electrode precursor 20 by using reference electrode 26. This measurement result is sent to controller 40 sequentially. Based on the measured potential, controller 40 controls the electric current which power unit 28 allows to flow between negative electrode precursor 20 and electrode 27. In other words, controller 40 controls the amount of lithium ions absorbed by the side facing electrode 27 of active material layer 20B. Finally, winding-up roll 22 winds up negative electrode precursor 20 that has been treated to absorb lithium ions.

Figure 5:
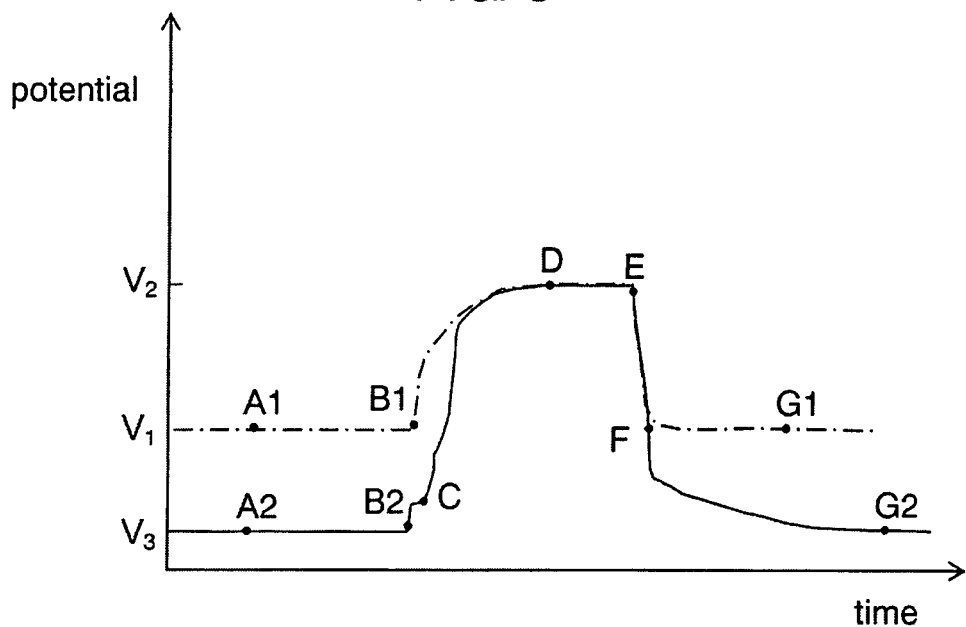
FIG. 5 is a graph schematically showing the change of measurement potential of a first potential sensor over time in accordance with the first embodiment of the present invention.

Next, with reference to FIGS. 5 and 6, the change of the measured potential by potential sensor 29 and supply of lithium to negative electrode precursor 20 are described. FIG. 5 is a graph schematically showing the change of the measured potential of potential sensor 29 over time. FIG. 6 shows schematic cross sectional views showing a state of lithium ions supplied to negative electrode precursor 20 and a state of lithium deposited on current collector-exposed portion 31.

When negative electrode precursor 20 is sent at a constant speed from supply roll 21 to winding-up roll 22 without allowing an electric current to flow from power unit 28, the measured potential of potential sensor 29 changes as shown by a dashed line when exposed portion 31 passes through non-aqueous electrolyte solution 25. That is to say, when active material layer 20B capable of absorbing lithium ions is in the measurement point of reference electrode 26, the potential is in a low state ($V_1$) as shown in point A1. When exposed portion 31 is inserted into non-aqueous electrolyte solution 25, the potential starts to increase as shown by point B1 and changes to the noble side. This is because the natural potential of current collector 20A is higher than that of the portion of negative electrode precursor 20 on which active material layer 20B is formed. Then, as the ratio of a portion occupied by exposed portion 31 in the part immersed in non-aqueous electrolyte solution 25 is increased, the potential is further increased. Then, as shown in point D, in a state in which only exposed portion 31 is immersed in non-aqueous electrolyte solution 25, the potential is most noble ($V_2$). When negative electrode precursor 20 is further sent, as shown in point E, active material layer 20B starts to be immersed in non-aqueous electrolyte solution 25. Therefore, the potential is gradually lowered and shifted to the base side. Then, in a state in which exposed portion 31 is not immersed in non-aqueous electrolyte solution 25 and only a part provided with active material layer 20B is immersed in non-aqueous electrolyte solution 25, the potential returns to $V_1$ as shown in point G1.

That is to say, that the potential is shifted to the noble side means that exposed portion 31 not absorbing lithium ions is increased as a potential measurement subject. That the potential is shifted to the base side means that active material layer 20B capable of absorbing lithium ions is increased as the potential measurement subject.

Based on such a potential profile, controller 40 controls power unit 28. A solid line in FIG. 5 shows the change of the measured potential of potential sensor 29 when controller 40 controls power unit 28. As shown in point A2, in the state in which only a part provided with active material layer 20B capable of absorbing lithium ions is immersed in non-aqueous electrolyte solution 25, power unit 28 allows an electric current to flow by using electrode 27 as a positive electrode and negative electrode precursor 20 that is brought into contact with immersion roll 23 as a negative electrode. Thus, an active material layer absorbs lithium ions. Alternatively, a sufficiently long current collector-exposed portion may be provided at the winding end portion of negative electrode precursor 20 so that the negative electrode side of power unit 28 is coupled to supply roll 21 and current collector 20A and supply roll 21 are brought into contact with each other. Thus, even in a case where active material layer 20B is formed in a state in which electric conductivity is relatively low, lithium ions can be absorbed by active material layer 20B reliably.

Potential $V_3$ at point A2 is lower than potential $V_1$ at point A1. This is because of the polarization of the charged electric current and because the part that has absorbed lithium ions is immersed in non-aqueous electrolyte solution 25. When exposed portion 31 is inserted into non-aqueous electrolyte solution 25, the potential starts to increase as shown by point B2. Controller 40 detects this potential change and stops electrolytic current from power unit 28 at point C. Then, since the polarization of the electric current disappears, the potential increases in a step-like manner. Furthermore, as the ratio of the site occupied by exposed portion 31 in the part immersed in non-aqueous electrolyte solution 25 becomes larger, the potential is further increased. In a state in which an electric current does not flow, as in the case shown by the dashed line, the potential is shifted to point E by way of point D. Then, at point F where the potential becomes $V_1$, controller 40 judges that exposed portion 31 completely exits from non-aqueous electrolyte solution 25, power unit 28 allows an electric current to flow by using electrode 27 as a positive electrode and negative electrode precursor 20 as a negative electrode. Thus, the potential further decreases and finally reaches $V_3$ as shown in point G2.

By controlling the electric current as mentioned above, lithium ions are absorbed by active material layer 20B without deposited lithium exposed portion 31. In this case, in the portion neighboring exposed portion 31 in active material layer 20B, the amount of absorbed lithium ions is slightly reduced. Then, in the moving direction (sending direction) of negative electrode precursor 20, the length of electrode 27 is made shorter with respect to the length of the portion inserted into non-aqueous electrolyte solution 25 of negative electrode precursor 20, and the on/off timing of power unit 28 may be delayed from the detection of point B2 and point E while the sending speed of negative electrode precursor 20 is considered. When controller 40 controls power unit 28 as described, lithium ions can be absorbed sufficiently also in a portion neighboring exposed portion 31 in active material layer 20B.

Furthermore, it is preferable that the length of the portion of negative electrode precursor 20 inserted into non-aqueous electrolyte solution 25 is the same as, or longer than the length of exposed portion 31 in the direction in which negative electrode precursor 20 is sent. Thereby, only there is timing when exposed portion 31 is immersed in non-aqueous electrolyte solution 25, and the potential in the vicinity of reference electrode 26 is clearly changed. Therefore, the electric current flowing between negative electrode precursor 20 and electrode 27 can be easily controlled.

As mentioned above, controller 40 needs to control power unit 28 appropriately while considering the length of negative electrode precursor 20 inserted into non-aqueous electrolyte solution 25, the length of exposed portion 31, the length of electrode 27 in the moving direction of negative electrode precursor 20, and the sending speed of negative electrode precursor 20. In particular, as mentioned above, when the length of electrode 27 is made shorter than the length of a portion inserted into non-aqueous electrolyte solution 25 of negative electrode precursor 20 in the sending direction of negative electrode precursor 20, and the on/off timing of power unit 28 is controlled to be delayed from the detection of point B2 and point E by considering the sending speed of negative electrode precursor 20, the boundary of absorption of lithium ions may be varied. This situation is described with reference to FIGS. 6A to 6D. In FIGS. 6A to 6D, for convenience, lithium ions absorbed by negative electrode active material layer 20B is shown as absorbed portion 30A.

Figure 6A:
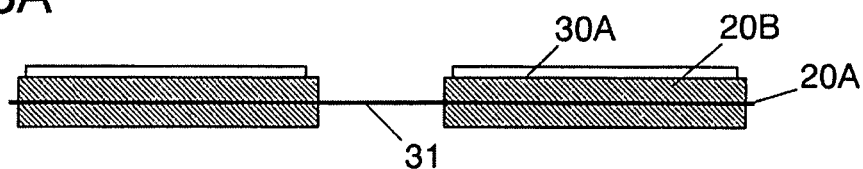
FIGS. 6A to 6D are schematic cross sectional views showing a state in which lithium ions are supplied to a negative electrode precursor by using the apparatus shown in FIG. 3 and a state in which lithium is deposited on an exposed portion of a current collector.

At point B2 at which the potential starts to increase, exposed portion 31 starts to be immersed into the entering side of non-aqueous electrolyte solution 25 that is a measurement site of reference electrode 26. At this point, electrode 27 does not face exposed portion 31. When electric current is stopped at this point, lithium is not deposited on exposed portion 31. However, as shown in FIG. 6A, in a portion that is near the boundary portion of active material layer 20B, a portion that does not absorb lithium ions or a portion in which the absorbed amount is small is formed.

Figure 6B:
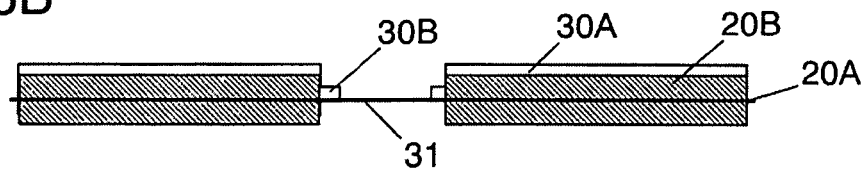
Figure 6C:
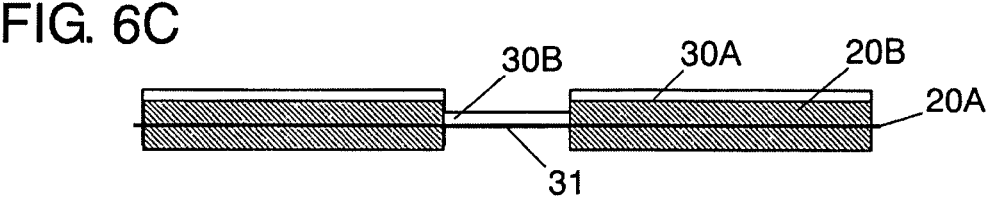
Figure 6D:
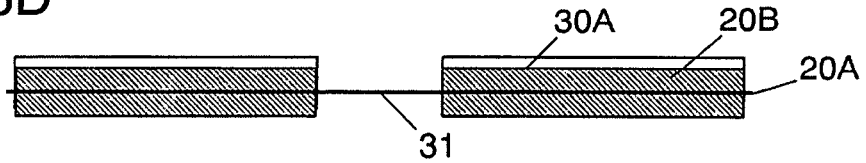

On the other hand, when the stopping timing of electric current is delayed, also after exposed portion 31 is immersed in non-aqueous electrolyte solution 25, lithium ions are supplied. Occasionally, as shown in FIG. 6B, lithium 30B is deposited on exposed portion 31. FIG. 6C shows a state in which lithium 30B is deposited on the entire of exposed portion 31 when electric current is not stopped. When the accuracy of the sending speed of negative electrode precursor 20 or the dimension accuracy of exposed portion 31 is improved, it is theoretically possible that lithium is not deposited on current collector exposed portion 31 and the entire active material layer 20B is allowed to absorb lithium ions as shown in FIG. 6D.

Then, an electric current is not turned on/off at the threshold of the potential, the electric current may be reduced when the potential is shifted to the noble side; and the electric current may be increased when the potential is shifted to the base side. Thus, in particular, in the boundary between exposed portion 31 and active material layer 20B, active material layer 2013 is allowed to absorb lithium ions as many as possible, and the deposition of lithium on exposed portion 31 can be reduced.

As non-aqueous electrolyte solution 25, it is possible to use the same materials as those for a non-aqueous electrolyte solution used for a battery. Furthermore, although not shown, it is preferable that before negative electrode precursor 20 pulled out from electrolytic bath 24 is wound up on winding-up roll 22, a solute contained in non-aqueous electrolyte solution 25 is removed by placing a non-aqueous solvent for dissolving the solute. Thus, it is possible to prevent the wound-up negative electrode precursors 20 from being attached to each other because solute is deposited, and it is possible to prevent from excess solutes from entering the battery.

As shown in FIG. 4, when negative electrode precursor 20 has active material layers 20B on both surfaces, that is to say, when a second active material layer is provided also on the rear side of the first active material layer having absorbed lithium ions as mentioned above, it is necessary that this second active material layer should be allowed to absorb lithium ions. Then, negative electrode precursor 20 that has been wound up on winding-up roll 22 is set to supply roll 21 again and active material layer 20B on the rear side (the second active material layer) is allowed to absorb lithium ions.

Figure 7:
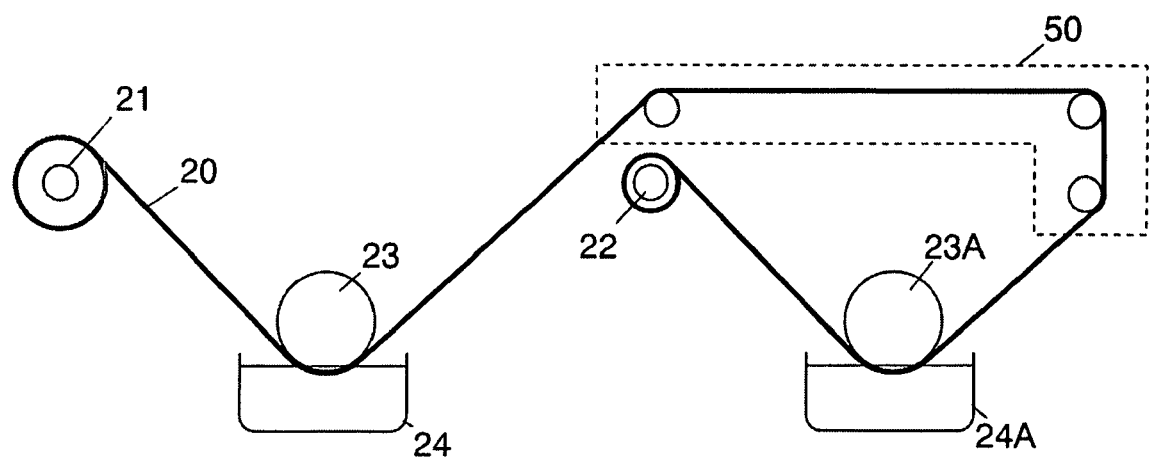
FIG. 7 is a schematic view showing a reversing portion in accordance with the first embodiment of the present invention.

Alternatively, another set shown in FIG. 3 including immersion roll 23, non-aqueous electrolyte solution 25, electrode 27, reference electrode 26, power unit 28, potential sensor 29 and controller 40 is prepared. Then, active material layer 20B at one side (the first active material layer) is allowed to absorb lithium ions and then, negative electrode precursor 20 is turned upside down by using reversing portion 50 including a plurality of rolls shown in FIG. 7, thus allowing active material layer 20B formed on the rear side (the second active material layer) to absorb lithium ions by using immersion roll 23A, electrolytic bath 24A and other parts. Thereafter, negative electrode precursor 20 is wound up on winding-up roll 22. Thus, active material layers 20B on both sides can be treated by one apparatus continuously.

As mentioned above, negative electrode precursor 20 has active material layers 20B on both surfaces of current collector 20A, it is preferable that both surfaces are allowed to absorb lithium ions. Thus, it is possible to compensate for the irreversible capacity of the negative electrode active material contained in the entire negative electrode precursor of a cylindrical shaped battery and a prismatic battery produced by winding a long length positive electrode and negative electrode.

Hereinafter, the effect of this embodiment is descried with reference to specific examples.

(1) Production of Negative Electrode

Figure 8:
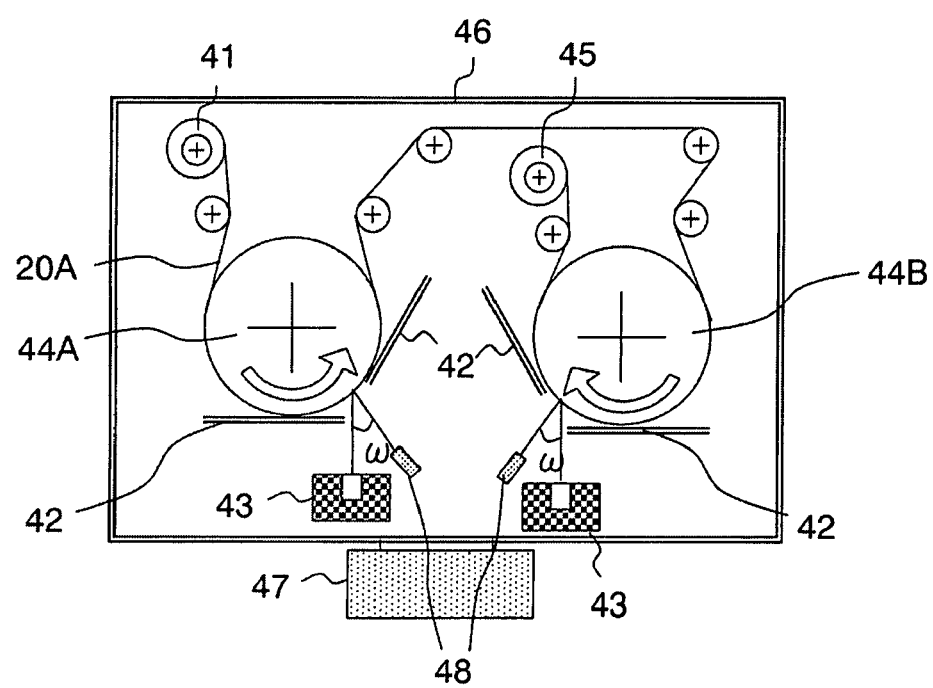
FIG. 8 is a schematic configuration view showing an apparatus for producing a negative electrode precursor in accordance with the first embodiment of the present invention.

Negative electrode precursor 20 is produced by using a manufacturing apparatus shown in FIG. 8. In this manufacturing apparatus, current collector 20A is sent from winding-out roll 41 to winding-up roll 45 by way of film-formation rolls 44A and 44B. These rolls and vapor deposition units 43 are provided in vacuum chamber 46. The pressure inside vacuum chamber 46 is reduced by using vacuum pump 47. Vapor deposition unit 43 is a unit including a vapor deposition source, a crucible and an electron beam generator.

As current collector 20A, 30 μm-thick electrolytic copper foil provided with concavity and convexity, specifically Ra=2.0 μm, by electrolytic plating is used. The inside of vacuum chamber 46 is an argon atmosphere with the pressure of 3.5 Pa. At the time of vapor deposition, an electron beam generated by the electron beam generator is polarized by a polarization yoke, and the vapor deposition source is irradiated with the electron beam. As the vapor deposition source, a scrap material (scrap silicon: purity 99.999%) generated when semiconductor wafers are manufactured is used. Meanwhile, oxygen gas with purity of 99.7% is introduced into vacuum chamber 46 from oxygen nozzle 48 disposed in the vicinity of current collector 20A. By adjusting the shape of the opening of mask 42, silicon vapor generated from vapor deposition unit 43 is prevented from vertically entering the surface of current collector 20A. Furthermore, angle ω made by the incident direction of silicon vapor and the incident direction of oxygen from oxygen nozzle 48 is set to 65°. Under such conditions, active material layer 20B is formed at the film formation speed of about 20 nm/sec. Thus, active material layer 20B made of a columnar bodies made of 21 μm-thick $SiO_{0.7}$ on the convex portions of current collector 20A is formed. Active material layer 20B is formed on one side by using film formation roll 44A, then current collector 20A is sent to film formation roll 44B so as to form active material layer 20B on the other surface.

In order to provide exposed portions 31 with 30 mm width on current collector 20A, heat resistant tapes are preliminarily attached to both surfaces of current collector 20A at equal intervals. The tapes are peeled off after the film is formed, and thereby exposed portions 31 are formed.

Then, according to the embodiment, negative electrode precursor 20 is allowed to absorb lithium ions electrochemically. Specifically, a current density on electrode 27 is set to 5 mAh/$cm^2$ and the sending speed of negative electrode precursor 20 is set to 5 m/min. The length of a portion of negative electrode precursor 20 in which negative electrode precursor 20 is immersed in non-aqueous electrolyte solution 25 along immersion roll 23 is made to be the same as that of exposed portion 31. Then, just after detection of point B2 and point F in FIG. 5, ON/OFF control of power unit 28 is carried out. In Example (a), the length of electrode 27 in the sending direction of negative electrode precursor 20 is made to be larger than the projected length in which negative electrode precursor 20 is immersed in non-aqueous electrolyte solution 25. In Example (b), the length is made to be substantially the same as the above-mentioned projected dimension. In Example (c), the length is made to be smaller than the above-mentioned projected dimension. As comparative example (a), negative electrode precursor 20 in which the potential is not controlled and which has treated to absorb lithium ions continuously is produced. Furthermore, as comparative example (b), negative electrode precursor 20 is produced, in which the potential is not measured and from the width and formation interval of exposed portions 31 and the sending speed of negative electrode precursor 20, treatment to absorb lithium ion is carried out while stopping an electric current for lithium ion absorption at predetermined intervals for the period of time corresponding to exposed portion 31. After absorption treatment of lithium ions is carried out in the each way mentioned above, negative electrode precursor 20 is cut into a predetermined dimension. Then, nickel lead 11 is welded at an end part which is near the winding core when the battery is formed. At this time, in the negative electrode of comparative example (a), as lead 11 is welded, deposited metallic lithium is overheated. Therefore, no more operation is carried out and battery is not produced.

(2) Production of Positive Electrode

Positive electrode 2 having a positive electrode active material capable of absorbing and releasing lithium ions is produced by the following method:

Firstly, 94 parts by weight of $LiCoO_2$ powder as a positive electrode active material and 3 parts by weight of acetylene black as a conductive agent are mixed. The obtained powder is mixed with an N-methyl-2-pyrrolidone (NMP) solution containing PVDF as a binder so that the weight of PVDF becomes 4 parts by weight. By adding an appropriate amount of NMP to the obtained mixture, a positive electrode mixture paste is prepared. The obtained positive electrode mixture paste is coated on both surfaces of the positive electrode current collector (thickness: 15 µm) made of aluminum (Al) foil by a doctor blade method, and sufficiently dried at 85° C. Furthermore, the dried one is roll-pressed so that the density of the positive electrode mixture layers becomes 3.6 g/cm$^3$ and the thickness thereof becomes 170 µm. By cutting this, positive electrode 2 is obtained. At an end part of positive electrode 2 which is near the winding core when the battery is formed and does not face negative electrode 1, an exposed portion is provided in Al foil, and Al lead 11 is welded thereon.

(3) Production and Evaluation of Battery

The negative electrode 1 and positive electrode 2 produced as mentioned above are wound via 20 µm-thick separator 3 made of porous polypropylene so as to form electrode body 9. Then, obtained electrode body 9 and a solution of $LiPF_6$ of a mixture solute of ethylene carbonate/ethylmethyl carbonate (volume ratio 1:2) as an electrolyte are accommodated in case 6. The opening of case 6 is sealed with lid 5 and frame 4 so as to produce a prismatic battery having the height of 50 mm, width of 34 mm and the thickness of 5 mm. The design capacity of the battery is set to 1100 mAh.

Each of the batteries thus produced is charged and discharged at environmental temperature of 25° C. under the below-mentioned conditions. Firstly, charging is carried out at constant current at hour rate of 1.0C to the design capacity (1100 mAh), namely at 1100 mA, until the battery voltage becomes 4.2 V. Then, constant voltage charging for attenuating to the current value of hour rate of 0.05C (55 mA) at 4.2 V of constant voltage is carried out. Then, the battery is in a rest for 30 minutes. Then, constant current discharging is carried out at a current value of hour rate of 1.0C (1100 mA) until the battery voltage is reduced to 2.5V. The above-mentioned charging and discharging is defined as one cycle. The discharge capacity in the third cycle is defined as the battery capacity. Then, the ratio (%) of the battery capacity to the design capacity is calculated. Furthermore, the thickness of the battery in a discharged state after three cycles is measured and the difference between this measured thickness and the thickness just after the assembled battery is defined as battery swelling. The evaluation results are shown in Table 1.

TABLE 1

| | Voltage control* | Ratio of battery capacity | Battery swelling |
|---|---|---|---|
| Example (a) | Do | 101% | 0.1 mm |
| Example (b) | Do | 100% | 0.05 mm |
| Example (c) | Do | 97% | 0.05 mm |
| Comparative Example (b) | Do | 81% | 0.05 mm |

*in "Voltage control," "Do" means that voltage control is carried out.

In Example (a), small portions of metallic lithium are deposited on exposed portion 31 as shown in FIG. 6B. In Example (b), lithium ions are absorbed in entire active material layer 20B including the vicinity of exposed portion 31 as shown in FIG. 6D. In Example (c), a portion that does not absorb lithium ions is left in a portion in the vicinity of exposed portion 31 as shown in FIG. 6A. However, as shown in Table 1, in Examples (a) to (c), although $SiO_{0.7}$ that is an active material having a large irreversible capacity is used for a negative electrode active material, the battery capacity near the design capacity can be obtained.

In Example (a), the battery is somewhat swollen due to the generation of gas, which is thought to be caused by a reaction between metallic lithium deposited on exposed portion 31 and the non-aqueous electrolyte solution. However, such small swelling does not cause a problem.

On the other hand, in comparative example (b), in order to prevent metallic lithium from being deposited on exposed portion 31, the margin of time for stopping an electric current is large. Therefore, a portion of active material layer 20B that has not absorbed lithium ions in the peripheral portion of exposed portion 31 is increased. Therefore, the irreversible capacity is increased and the battery capacity is reduced.

Electrode 27 is formed of metallic lithium and the like. Therefore, the size of the electrode is reduced in accordance with the using time. That is to say, even if electrode 27 having a size of Example (a) is used, the battery is gradually shifted to the state of Example (c) by way of Example (b). However, as shown in Table 1, even if the size of electrode 27 is somewhat changed, the battery capacity is not largely changed.

Second Embodiment

Figure 9:
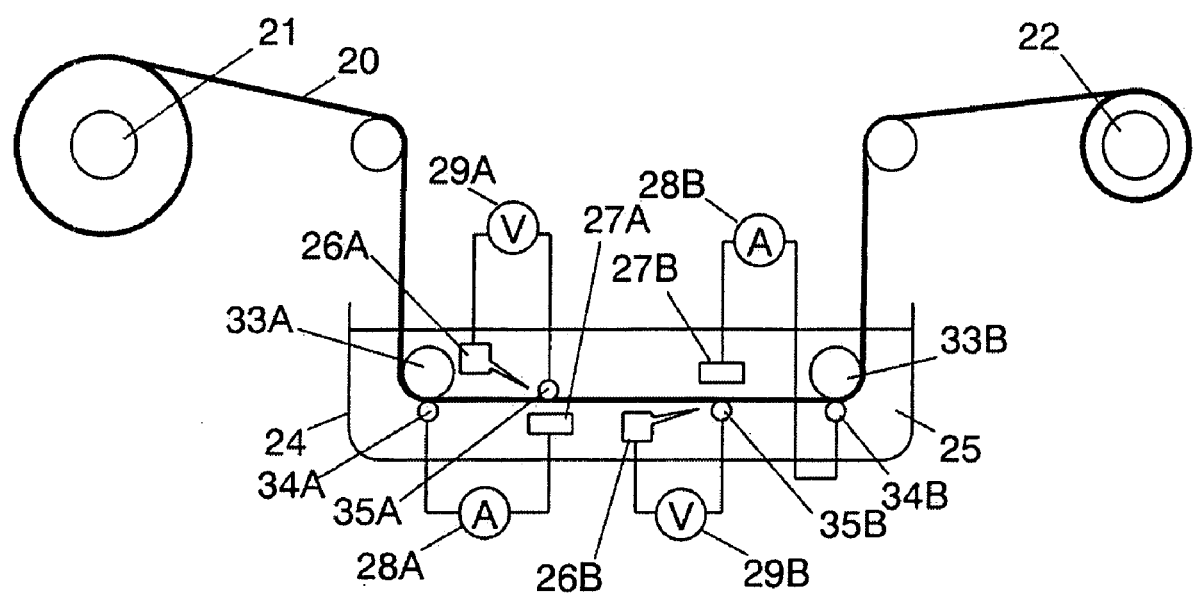
FIG. 9 is a schematic configuration view showing an apparatus for allowing a negative electrode active material layer of a negative electrode precursor to absorb lithium ions in accordance with a second embodiment of the present invention.

FIG. 9 is a schematic configuration view showing an apparatus for allowing a negative electrode active material layer of a negative electrode precursor to absorb lithium ions in accordance with a second embodiment of the present invention. In the present embodiment, support rolls 33A and 33B are provided in non-aqueous electrolyte solution 25 and negative electrode precursor 20 is stretched between the support rolls. Then, active material layers 20B on both surfaces of negative electrode precursor 20 are allowed to absorb lithium ions continuously.

Specifically, non-aqueous electrolyte solution 25 is provided with a pair of electrode 27A and reference electrode 26A and a pair of electrode 27B that is the same as electrode 27A and reference electrode 26B that is the same as reference electrode 26A. Electrodes 27A and 27B are disposed opposite to each other with respect to negative electrode precursor 20. Reference electrode 26B is disposed in the vicinity of negative electrode precursor 20. Potential roll 35A is brought into contact with negative electrode precursor 20 in a position facing electrode 27A with respect to negative electrode precursor 20. Potential sensor 29A measures a voltage between reference electrode 26A and potential roll 35A, thereby measuring a potential of the position facing electrode 27A of negative electrode precursor 20. Similarly, potential roll 35B is brought into contact with negative electrode precursor 20 in a position facing electrode 27B with respect to negative electrode precursor 20. Potential sensor 29B measures a voltage between reference electrode 26B and potential roll 35B, thereby measuring a potential of the position facing electrode 27B of negative electrode precursor 20.

On the other hand, electrolytic roll 34A and support roll 33A sandwich negative electrode precursor 20 therebetween. Thereby, electrolytic roll 34A is brought into close contact with negative electrode precursor 20 so that the electric resistance becomes small. Power source 28A is controlled by a controller (not shown) based on the detection results of potential sensor 29A and allows an electric current to flow between electrode 27A and electrolytic roll 34A. Thus, active material layer 20B of negative electrode precursor 20 located in the lower side (the first active material layer) of the figure is allowed to absorb lithium ions. Similarly, electrolytic roll 34B and support roll 33B sandwich negative electrode precursor 20 therebetween. Power source 28B is controlled by a controller (not shown) based on the detection results of potential sensor 29B and allows an electric current to flow between electrode 27B and electrolytic roll 34B. Thus, active material layer 20B of negative electrode precursor 20 located in the upper side (the second active material layer) of the figure is allowed to absorb lithium ions.

In other words, after the first active material layer is allowed to absorb lithium ions, an untreated second active material layer is disposed facing electrode 27B. By using electrode 27B and reference electrode 26B, the second active material layer is allowed to absorb lithium ions. Thus, active material layers 20B on both surfaces are allowed to absorb lithium ions continuously. As described above, when two pairs of reference electrodes and counter electrodes (the first and second electrodes) are provided, active material layers 20B on both surfaces of negative electrode precursor 20 can be treated continuously.

Since controlling by the controller is the same as in the first embodiment, the description therefor is omitted herein. Furthermore, the controller may be provided individually for power unit 28A and power unit 28B.

Third Embodiment

The detailed contents of configuration, materials, and the like, of a non-aqueous electrolyte secondary battery in accordance with the present embodiment are the same as those of the first embodiment.

Figure 10:
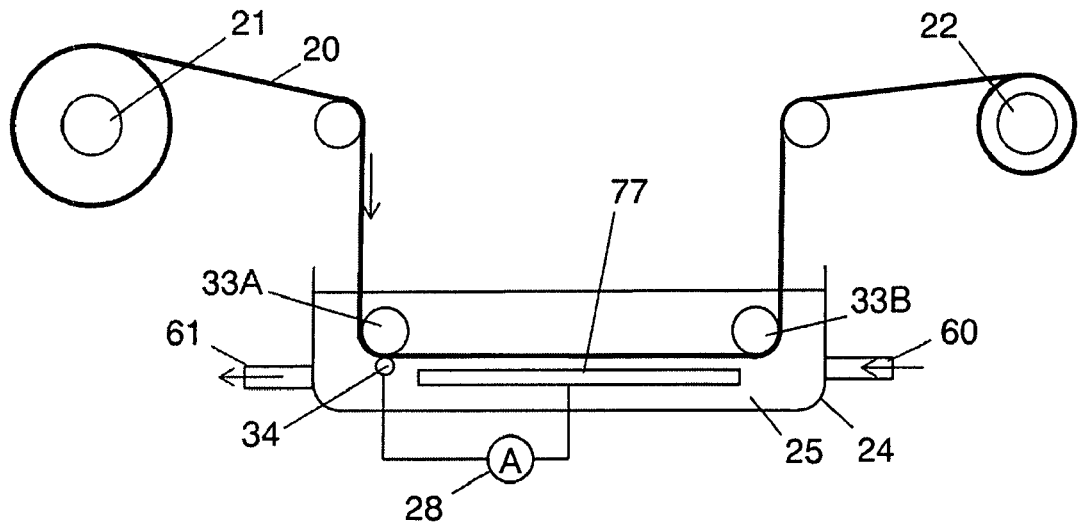
FIG. 10 is a schematic configuration view showing an apparatus for allowing a negative electrode active material layer of a negative electrode precursor to absorb lithium ions in accordance with a third embodiment of the present invention.

Here, with reference to FIG. 10, an apparatus for allowing a negative electrode active material layer of a negative electrode precursor to absorb lithium ions is described. FIG. 10 is a schematic configuration view showing an apparatus for allowing the negative electrode active material layer of the negative electrode precursor to absorb lithium ions.

Negative electrode precursor 20 produced by the same method as in the first embodiment includes a current collector and active material layers formed on the surface (both surfaces) of the current collector. Negative electrode precursor 20 is supplied in a state in which it is wound on supply roll 21. Supply roll 21 is a winding-out portion for pulling out negative electrode precursor 20 that has been wound up.

This apparatus includes supply roll 21, electrolytic bath 24, power unit 28, counter electrode 77 and winding-up roll 22. Electrolytic bath 24 holds non-aqueous electrolyte solution 25 containing lithium ions. Electrolytic bath 24 includes supplying portion 60 for supplying electrolytic bath 24 with a non-aqueous electrolyte solution having the same composition as non-aqueous electrolyte solution 25, and removing portion 61 for removing non-aqueous electrolyte solution 25 from electrolytic bath 24 in the same amount as the supplied amount. Furthermore, in electrolytic bath 24, electrolytic roll 34 and support roll 33A are provided with negative electrode precursor 20 sandwiched therebetween. Furthermore, support roll 33B is provided in parallel with support roll 33A. Negative electrode precursor 20 is stretched between support roll 33A and support roll 33B with a predetermined tension. Electrode 77 is provided facing the thus stretched negative electrode precursor 20. Electrode 77 includes carbonaceous material such as glassy carbon and a graphite sintered body, or noble metal such as platinum, which are materials inactive to the supply of lithium ions. Electrode 77 is disposed in non-aqueous electrolyte solution 25. Power unit 28 allows an electric current to flow between electrode 77 and negative electrode precursor 20, and allows the side facing electrode 77 of the active material layers (a first active material layer) to absorb lithium ions. At this time, power unit 28 allows an electric current to flow to negative electrode precursor 20 via electrolytic roll 34. Winding-up roll 22 as a winding-up portion winds up negative electrode precursor 20 after being treated, to absorb lithium ions.

A method for allowing the active material layer of negative electrode precursor 20 to absorb lithium ions by using this apparatus is described. Firstly, wound-up negative electrode precursor 20 is pulled out from supply roll 21. Next, pulled-out negative electrode precursor 20 is inserted into electrolytic bath 24 holding non-aqueous electrolyte solution 25 containing lithium ions. Then, power unit 28 allows an electric current to flow by using electrode 77 as the positive electrode side and electrolytic roll 34 as the negative electrode side. Thus, lithium ions in non-aqueous electrolyte solution 25 are absorbed by the active material layer. Alternatively, a sufficiently long exposed portion of the current collector may be provided at the winding end portion of the negative electrode precursor 20 so that the negative electrode side of power unit 28 is coupled to supply roll 21 and the current collector and supply roll 21 are brought into contact with each other. Thus, even if the active material layer is formed in a state in which electronic conductivity is relatively low, the active material layer can absorb lithium ions, reliably.

Electrode 77 is inactive to the supply of lithium ions. Therefore, when the active material layer is allowed to absorb lithium ions continuously, the lithium ion concentration in non-aqueous electrolyte solution 25 is lowered. When the lithium ion concentration is lowered, overvoltage is increased and the amount of absorbed lithium ions is reduced. Therefore, a non-aqueous electrolyte solution having the same composition as non-aqueous electrolyte solution 25 is supplied to electrolytic bath 24 from supplying portion 60 and at the same time, non-aqueous electrolyte solution 25 is removed in the same amount as the supplied amount from electrolytic bath 24 via removing portion 61. Thus, the lithium ion concentration in non-aqueous electrolyte solution 25 is kept approximately constant. Finally, negative electrode precursor 20 that has been treated to absorb lithium ions is wound up by winding-up roll 22.

Thus, in the present embodiment, negative electrode precursor 20 is allowed to absorb lithium ions electrochemically in non-aqueous electrolyte solution 25. Consequently, it is possible to supply negative electrode active materials with lithium ions in an amount necessary to compensate for the irreversible capacity of the negative electrode active materials. Thus, a large capacity density of negative electrode active materials can be utilized. At this time, an active material is allowed to absorb lithium ions dissolved in non-aqueous electrolyte solution 25 by using electrode 77 that is inactive to the supply of lithium ions. On the other hand, a non-aqueous electrolyte solution having the same composition as that of non-aqueous electrolyte solution 25 is supplied to electrolytic bath 24 and non-aqueous electrolyte solution 25 is removed from electrolytic bath 24 in the same amount as the supplied amount. Thereby, the concentration of lithium ions in non-aqueous electrolyte solution 25 is kept approximately constant. Thus, it is possible to allow the active material layer of negative electrode precursor 20 to absorb lithium ions continuously.

For example, when the current flowing in electrode 77 is 10A, the lithium ion concentration of non-aqueous electrolyte solution 25 is 1 mol/l, and the irreversible capacity corresponding to negative electrode, 1 Ah per cell, is compensated by 1 h charging, the supplied amount from supplying portion 60 of non-aqueous electrolyte solution 25 becomes 0.037 l/h. It is preferable that the density of electric current flowing in electrode 77 is at least 1 $mA/cm^2$ and at most 10 $mA/cm^2$ so that the absorption reaction of lithium ions is predominant.

Supplying portion 60 is provided on the end side in the moving direction of negative electrode precursor 20 in electrolytic bath 24. Removing portion 61 is provided on the side where negative electrode precursor 20 is inserted in electrolytic bath 24. Therefore, in electrolytic bath 24, non-aqueous electrolyte solution 25 flows from the direction opposite to the moving direction of negative electrode precursor 20. Thus, turbulent flow tends to occur in non-aqueous electrolyte solution 25 and the concentration of lithium ions in electrolytic bath 24 tends to be uniform. Therefore, it is possible to allow the active material layer to absorb lithium ions stably. This is particularly effective in the case where the electrode is relatively long in the moving direction of negative electrode precursor 20.

For non-aqueous electrolyte solution 25, a non-aqueous electrolyte solution that is the same material as that used for a battery can be used. Although not shown, it is preferable that before negative electrode precursor 20 that has been pulled out from electrolytic bath 24 is wound up on winding-up roll 22, a solute contained in non-aqueous electrolyte solution 25 is removed by placing negative electrode precursor 20 in a solvent capable of dissolving the solute. Thus, it is possible to prevent wound-up negative electrode precursors 20 from being attached to each other because solutes are deposited or it is possible to prevent excess solutes from being entering the battery.

When negative electrode precursor 20 has active material layers on both surfaces thereof, that is to say, when the second active material layer is also provided on the rear side of the first active material layer absorbing lithium ions as mentioned above, it is necessary to allow this second active material layer to absorb lithium ions. Then, negative electrode precursor 20 that has wound up on winding-up roll 22 is set in supply roll 21 again and allows the active material layer on the rear side (the second active material layer) to absorb lithium ions.

Alternatively, another set of electrolytic bath 24, electrode 77 and power unit 28 is prepared as shown in FIG. 10. Then, the active material layer on one surface side (the first active material layer) is allowed to absorb lithium ions and negative electrode precursor 20 is turned upside down. Subsequently, by using a second electrolytic bath and the other equipment, the active material layer on rear surface side (the second active material layer) is allowed to absorb lithium ions. Thereafter, negative electrode precursor 20 is wound up by winding-up roll 22. Alternatively, by preparing another set of electrode 77 and power unit 28 so as to face the active material layer on the rear side, the first and second active material layers may be allowed to absorb lithium ions from both sides of negative electrode precursor 20 simultaneously. Thus, it is possible to treat the active material layers on both surfaces continuously.

Thus, when negative electrode precursor 20 has the active material layers on both surfaces of the current collector, it is preferable that both surfaces are allowed to absorb lithium ions. Accordingly, it is possible to compensate for the irreversible capacity of the negative electrode active materials contained in the entire negative electrode precursor of a cylindrical battery or a prismatic battery configured by winding long positive and negative electrodes.

Fourth Embodiment

Figure 11:
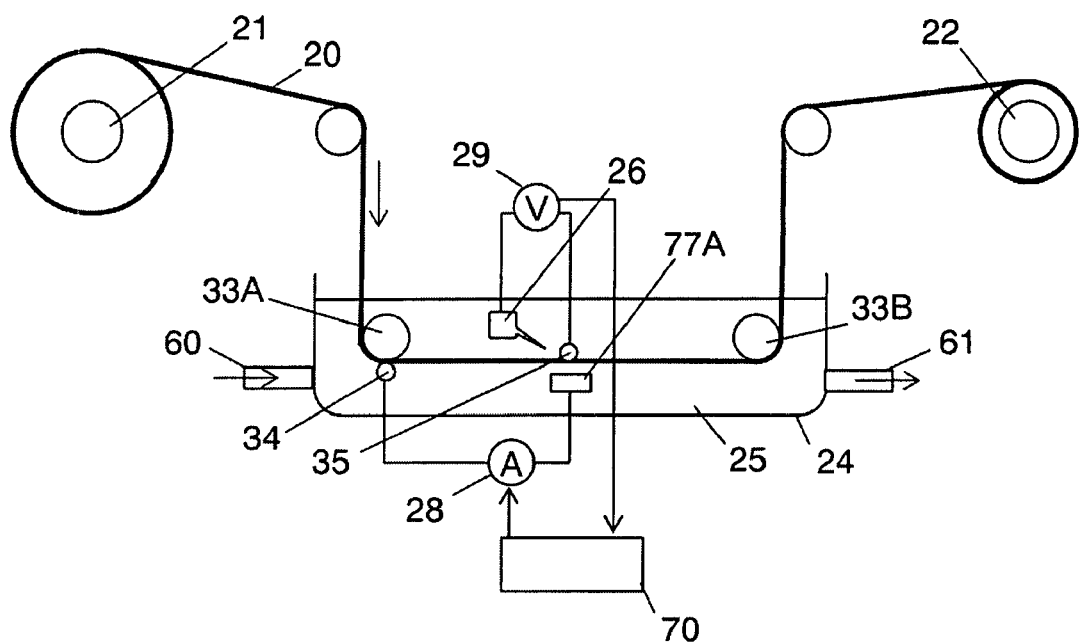
FIG. 11 is a schematic configuration view showing an apparatus for allowing a negative electrode active material layer of a negative electrode precursor to absorb lithium ions in accordance with a fourth embodiment of the present invention.

FIG. 11 is a schematic configuration view showing an apparatus for allowing a negative electrode active material layer of the negative electrode precursor to absorb lithium ions in accordance with a fourth embodiment of the present invention. The same reference numerals are given to the same configuration as those of the third embodiment and detailed description thereof is omitted herein. The present embodiment is different from the third embodiment in the following three points:

(1) Counter electrode 77A whose length in the moving direction of negative electrode precursor 20 is shorter than that of counter electrode 77 is used.

(2) Potential roll 35 is provided on the opposite side to electrode 77A with respect to negative electrode precursor 20 and is brought into contact with negative electrode precursor 20. In addition, reference electrode 26 is disposed in the vicinity of potential roll 35. Potential sensor 29 for measuring the potential of potential roll 35 with respect to reference electrode 26 is provided. The output from potential sensor 29 is input into controller 70. Controller 70 controls power unit 28.

(3) Removing portion 61 is provided on the end side of electrolytic bath 24 in the moving direction of negative electrode precursor 20. Supplying portion 60 is provided on the side where negative electrode precursor 20 is inserted in electrolytic bath 24.

In negative electrode 1, a part of a negative electrode current collector needs to be exposed for attaching lead 11. Such an exposed portion may be formed prior to the absorption treatment of lithium ions. In this case, it is possible to reduce the loss of active materials due to the removal of the active material layer by forming the active material layer intermittently. However, in this case, prior to the absorption treatment of lithium ions, the exposed portion of the current collector is provided in negative electrode precursor 20. When the lithium ion absorption treatment is carried out by using the apparatus of the third embodiment, highly reactive metallic lithium may be deposited on the exposed portion and may be overheated when the exposed portion is welded. Potential sensor 29, controller 70, and the like, are provided for suppressing the deposition of metallic lithium onto the exposed portion. Furthermore, electrode 77A is made smaller than electrode 77.

Potential sensor 29 measures a potential of a portion immersed in non-aqueous electrolyte solution 25 of negative electrode precursor 20 and in the vicinity of reference electrode 26 by using reference electrode 26. This measurement results are sent to controller 70 successively. Controller 70 controls power unit 28 based on the measured potential and controls the electric current flowing between negative electrode precursor 20 and electrode 77A. That is to say, controller 70 controls the amount of lithium ions absorbed by the active material layer at the side facing electrode 77A.

The change of measured potential of potential sensor 29 and supply of lithium to negative electrode precursor 20 are the same as in that described in the first embodiment using FIG. 5. In other words, FIG. 5 is also a graph schematically showing the change of measured potential of potential sensor 29 over time in the fourth embodiment of the present invention.

As described in the first embodiment, when negative electrode precursor 20 is sent at a constant speed from supply roll 21 to winding-up roll 22 without allowing an electric current to flow from power unit 28, the measurement potential of potential sensor 29 is changed as shown in the dashed line while the exposed portion of the current collector passes through the vicinity of reference electrode 26. In other words, when the active material layer capable of absorbing lithium ions is located in the measurement point of reference electrode 26, the potential is in a low state ($V_1$) as point A1. Then, when the exposed portion is inserted into non-aqueous electrolyte solution 25 and approaches to the measurement portion of reference electrode 26, the potential starts to increase and is shifted to the noble side as shown in point B1. This is because the natural potential of the current collector is higher than that of a portion provided with the active material layer of negative electrode precursor 20. When the exposed portion reaches the measurement portion of reference electrode 26, the potential becomes the highest ($V_2$) as shown in point D. When negative electrode precursor 20 is further sent, the exposed portion is apart from the measurement portion of reference electrode 26 and the potential is gradually reduced and is changed to the base side as shown in point E. Then, in a state in which the exposed portion is not immersed in non-aqueous electrolyte solution 25, and only the portion provided with the active material layer is immersed in non-aqueous electrolyte solution 25, the potential returns to $V_1$ as shown in point G1.

Based on such a potential profile, controller 70 controls power unit 28. A solid line in FIG. 5 shows the change of the measurement potential of potential sensor 29 when controller 70 controls power unit 28. As shown in point A2, in a state in which only a portion provided with the active material layer capable of absorbing lithium ions is immersed in non-aqueous electrolyte solution 25, power unit 28 allows an electric current to flow by using electrode 77A as a positive electrode and negative electrode precursor 20 that is in brought contact with immersion roll 34 as a negative electrode. Thus, lithium ions are absorbed by the active material layer. Potential $V_3$ at point A2 is lower than potential $V_1$ at point A1. This is because of the polarization due to charging current and because the portion having absorbed lithium ions is immersed in non-aqueous electrolyte solution 25. When the exposed portion is inserted into non-aqueous electrolyte solution 25, the potential starts to increase as shown by point B2. Controller 70 detects this potential change. When the detected potential is a predetermined value or more, controller 70 stops electrolytic current from power unit 28 (point C). Then, voltage drop by electrolytic current does not occur, so that potential is increased in a step-like manner.

Furthermore, as the exposed portion reaches the measurement portion of reference electrode 26, potential is increased. In a state in which electric current does not flow, as in the case shown by the dashed line, the potential is changed from point D to point E. Then, at point F where the potential becomes $V_1$, controller 70 judges that the exposed portion completely exits from a region to be electrolyzed by electrode 77A, and power unit 28 allows an electric current to flow by using electrode 77A as the positive electrode and negative electrode precursor 20 as the negative electrode. Thus, the potential further decreases and finally reaches $V_3$ as shown in point G2. When the controlling is carried out as mentioned above, lithium is not deposited on the exposed portion of the current collector and lithium ions are absorbed by the active material layer.

Thus, in the present embodiment, similar to the first and second embodiments, negative electrode precursor 20 has the exposed portion on the current collector. The electric current flowing between negative electrode precursor 20 and electrode 77A is stopped in a state in which the exposed portion faces electrode 77A. Therefore, the length of electrode 77A is relatively small in the moving direction of negative electrode precursor 20. In such a condition, by allowing an electric current to flow from the same direction as the moving direction of negative electrode precursor 20, non-aqueous electrolyte solution 25 can be carried to the position facing electrode 77A along the movement of negative electrode precursor 20. Thus, a spot concentration of lithium ions in a position to be actually electrolyzed can be made substantially constant.

Note here that another set of reference electrode 26, potential sensor 29, power unit 28, electrode 77A, controller 70, and the like, may be prepared, and a second electrode may be disposed on the opposite side to electrode 77A with respect to negative electrode precursor 20. In other words, after the first active material layer is allowed to absorb lithium ions, an untreated second active material layer is disposed facing the second electrode. By using the second electrode and the second reference electrode, the second active material is allowed to absorb lithium ions. Thus, the active material layers on the both surfaces are allowed to absorb lithium ions continuously.

As mentioned above, according to the present invention, by allowing a negative electrode precursor to absorb lithium ions in a non-aqueous electrolyte solution electrochemically, it is possible to supply a negative electrode active material with lithium ions in an amount that can compensate for the irreversible capacity of the negative electrode active material. Thus, it is possible to utilize high capacity density of the negative electrode active material. Furthermore, according to the invention disclosed in the first, second and fourth embodiments, it is possible to suppress the deposition of highly reactive metallic lithium on the exposed portion of the current collector used for electric connection between the negative electrode and an external terminal. Thus, when the exposed portion is welded, problems such as ignition to metallic lithium do not occur. Meanwhile, according to the invention disclosed in the third and fourth embodiments, non-aqueous electrolyte solution is supplied while the same amount of non-aqueous electrolyte solution is removed, thereby the concentration of lithium ions in the non-aqueous electrolyte solution can be made constant. Thus, it is possible to allow the active material layer of the negative electrode precursor to absorb lithium ions continuously. In any case, the productivity can be improved. The present invention is useful for a lithium secondary battery employing a negative electrode active material with particularly large irreversible capacity.

What is claimed is:

1. A method for manufacturing a negative electrode for a non-aqueous electrolyte secondary battery, in which a negative electrode precursor of the non-aqueous electrolyte secondary battery is allowed to absorb lithium ions, the negative electrode precursor includes a current collector made of a conductor and a first active material layer formed on the current collector, an exposed portion is formed by making a part of the current collector be exposed, the method comprising:
   (A) pulling out the negative electrode precursor wound up;
   (B) inserting the pulled-out negative electrode precursor into a non-aqueous electrolyte solution containing lithium ions;
   (C) measuring a potential in a vicinity of a first reference electrode in a portion immersed in the non-aqueous electrolyte solution of the negative electrode precursor by using the first reference electrode provided in the non-aqueous electrolyte solution;
   (D) controlling an amount of lithium ions absorbed by the first active material layer by controlling an electric current flowing between the negative electrode precursor and a first electrode disposed facing the first active material layer and capable of releasing lithium ions in the non-aqueous electrolyte solution, based on the measured potential; and
   (E) winding up the negative electrode precursor treated to absorb lithium ions,
   wherein a length of a portion of the negative electrode precursor that is inserted in the non-aqueous electrolyte solution in a moving direction of the negative electrode precursor is at least a length of the exposed portion of the current collector in the moving direction of the negative electrode precursor in step B.

2. The method according to claim 1, wherein the negative electrode precursor has a second active material layer formed on a surface of the current collector opposite to a surface provided with the first active material layer; and
   the method further comprises
   (F) disposing the second active material layer so that the second active material layer faces the first electrode after D step;
   and wherein same processes as B step to D step are carried out so as to allow the second active material layer to absorb lithium ions after F step, and then E step is carried out.

3. The method according to claim 2, wherein after D step, F step is carried out by taking out the negative electrode precursor from the non-aqueous electrolyte solution, and turning upside down the negative electrode precursor.

4. The method according to claim 1, wherein the negative electrode precursor has a second active material layer formed on a surface of the current collector opposite to surface provided with the first active material layer;
   a second electrode similar to the first electrode is disposed on the opposite side to the first electrode with respect to the negative electrode precursor and a second reference electrode similar to the first reference electrode is disposed in a vicinity of the negative electrode precursor in the non-aqueous electrolyte solution,
   the method further comprises
   (F) disposing the second active material layer so that the second active material layer faces the first electrode after D step;
   and wherein same processes as B step to D step are carried out using the second electrode and the second reference electrode so as to allow the first active material layer and the second active material layer to absorb lithium ions continuously, and then E step is carried out.

5. The method according to claim 1, wherein the electric current is stopped when the potential is shifted to a noble side and the electric current is allowed to flow when the potential is shifted to a base side in D step.

6. The method according to claim 1, wherein the electric current is reduced when the potential is shifted to a noble side and the electric current is increased when the potential is shifted to a base side in D step.

7. The method according to claim 1, further comprising detecting that the exposed portion is inserted into the non-aqueous electrode based on the measured potential, and
   stopping the electric current when the exposed portion is inserted into the non-aqueous electrode.

8. An apparatus for allowing a negative electrode precursor of a non-aqueous electrolyte secondary battery to absorb lithium ions, the negative electrode precursor including a current collector made of a conductor and a first active material layer formed on the current collector and a exposed portion being formed by making a part of the current collector be exposed, the apparatus comprising:
   a winding-out portion configured to pull out the negative electrode precursor wound up;
   an electrolytic bath configured to hold a non-aqueous electrolyte solution containing lithium ions and to immerse the pulled-out negative electrode precursor in the non-aqueous electrolyte solution;
   a first electrode disposed in the non-aqueous electrolyte solution and capable of releasing lithium ions;
   a power unit configured to allow an electric current to flow between the first electrode and the negative electrode precursor and to allow the first active material layer to absorb lithium ions;
   a first reference electrode disposed in a vicinity of a portion immersed in the non-aqueous electrolyte solution of the negative electrode precursor;
   a first potential sensor configured to measure a potential of the portion immersed in the non-aqueous electrolyte solution of the negative electrode precursor with respect to the first reference electrode;
   a controller configured to control an amount of lithium ions absorbed by the first active material layer by controlling an electric current flowing between the negative electrode precursor and the first electrode based on the potential, measured by the first potential sensor; and
   a winding-up portion configured to wind up the negative electrode precursor treated to absorb lithium ions,
   the apparatus further comprising an immersion roll configured to set a length of a portion of the negative electrode precursor that is inserted in the non-aqueous electrolyte solution in a moving direction of the negative electrode precursor is at least a length of the exposed portion of the current collector in the moving direction of the negative electrode precursor,
   wherein the negative electrode precursor is inserted into the non-aqueous electrolyte solution in a state along the immersion roll.

9. The apparatus according to claim 8, wherein the negative electrode precursor has a second active material layer formed on a surface of the current collector opposite to a surface provided with the first active material layer;
   the apparatus further comprises a reversing portion configured to turn upside down the negative electrode precursor including the first active material layer having absorbed lithium ions; and the negative electrode precursor including the first active material layer having absorbed lithium ions is taken out from the non-aqueous electrolyte solution, and the second active material layer is allowed to absorb lithium ions.

10. The apparatus according to claim 8, wherein the negative electrode precursor has a second active material layer formed on a surface of the current collector opposite to a surface provided with the first active material layer;

the apparatus further comprises:
a second electrode similar to the first electrode, which is disposed on the opposite side to the negative electrode precursor in the non-aqueous electrolyte solution;
a second reference electrode similar to the first reference electrode, which is disposed in a vicinity of the negative electrode precursor in the non-aqueous electrolyte solution; and
a second potential sensor configured to measure a potential of a portion immersed in the non-aqueous electrolyte solution of the negative electrode precursor with respect to the second reference electrode; and wherein after the first active material layer is allowed to absorb lithium ions, the second active material layer is allowed to absorb lithium ions continuously.

11. The apparatus according to claim 8, wherein the electric current is reduced when the potential is shifted to a noble side; and the electric current is increased when the potential is shifted to a base side.

12. The apparatus according to claim 8, wherein the electric current is stopped when the potential is shifted to a noble side and the electric current is allowed to flow when the potential is shifted to a base side.

13. The apparatus according to claim 8, further comprising a detector configured to detect that the exposed portion is inserted into the non-aqueous electrode based on the measured potential and stop the electric current when the exposed portion is inserted into the non-aqueous electrode.

* * * * *